US006961711B1

(12) United States Patent
Chee

(10) Patent No.: US 6,961,711 B1
(45) Date of Patent: Nov. 1, 2005

(54) METHOD AND SYSTEM FOR FACILITATING DELIVERY AND PICKUP OF GOODS

(76) Inventor: Fong Fatt Chee, 8 Kheam Hock Road, Singapore 298782 (SG)

( * ) Notice: Subject to any disclaimer, the term of this patent is extended or adjusted under 35 U.S.C. 154(b) by 281 days.

(21) Appl. No.: 10/088,057

(22) PCT Filed: Sep. 12, 2000

(86) PCT No.: PCT/SG00/00143

§ 371 (c)(1),
(2), (4) Date: Mar. 13, 2002

(87) PCT Pub. No.: WO01/20423

PCT Pub. Date: Mar. 22, 2001

(30) Foreign Application Priority Data

Sep. 15, 1999 (SG) ............................................. 9904582

(51) Int. Cl.[7] ............................................. G06F 17/60
(52) U.S. Cl. ............................. 705/26; 232/27; 340/569
(58) Field of Search ...................... 705/26, 27; 232/17, 232/19, 20, 21, 27; 340/569

(56) References Cited

U.S. PATENT DOCUMENTS

| 4,894,717 A | * | 1/1990 | Komei ........................ 348/150 |
| 5,475,378 A | * | 12/1995 | Kaarsoo et al. ......... 340/825.34 |
| 5,774,053 A | * | 6/1998 | Porter ......................... 340/568 |
| 6,010,239 A | * | 1/2000 | Hardgrave et al. ..... 364/478.01 |
| 6,085,170 A | * | 7/2000 | Tsukuda ........................ 705/26 |
| 6,204,763 B1 | * | 3/2001 | Sone ......................... 340/568.1 |
| 6,323,782 B1 | * | 11/2001 | Stephens et al. ........ 340/825.31 |
| 6,426,699 B1 | * | 7/2002 | Porter ...................... 340/568.1 |
| 2004/0015393 A1 | * | 1/2004 | Fong et al. .................... 705/13 |

FOREIGN PATENT DOCUMENTS

| GB | 2302976 | 2/1997 |
| WO | WO-97/43935 A1 * | 11/1997 ........... A47G/29/12 |

OTHER PUBLICATIONS

"ShopLink Invests $25 Million in Information Technology for National Expansion"; Business/Technology Editors; Business Wire; New York NY; Sep. 7, 1999; p. 1.*

* cited by examiner

Primary Examiner—Jeffrey A. Smith

(57) ABSTRACT

The present system facilitates delivery and pickup of goods by providing a locker module at a location near a customer's residential site. For a vendor to deliver a good to the customer, the vendor leases a unit in the locker module from the system controller by accessing the system controller's website and providing details of the customer and a delivery agent. The vendor then notifies the delivery agent to make the delivery. The delivery agent provides the system controller the particulars of its delivery person. The designated delivery person accesses the leased locker unit using a registered smart card and delivers the good. The system controller notifies the customer of the delivered good. The customer accesses the locker unit containing the good by using a registered smart card.

14 Claims, 14 Drawing Sheets

METHOD AND SYSTEM FOR FACILITATING DELIVERY AND PICKUP OF GOODS

FIELD OF THE INVENTION

The present invention relates generally to the fields of goods delivery and storage systems, and in particular, to a system for facilitating delivery and pickup of transported goods such as parcels, laundry, grocery, etc.

BACKGROUND OF THE INVENTION

It is a well known fact that many households order goods to be delivered to their place of residence. The pace of the modern day life is fast. Often, people simply do not have the time to shop. These days, all types of goods can be ordered to be delivered. For instance, many department stores have catalogues where virtually every item sold in the stores can be ordered by mail. Even businesses that traditionally did not previously make regular deliveries such as the groceries or laundries are now offering a delivery service.

Although the convenience of having something delivered to one's home as opposed to traveling to the place where the item is sold can be easily appreciated, the process of receiving the delivered good can be a bit cumbersome. This is because often the agent responsible for delivering the items requires that a person be physically present at the delivery location to receive the goods. Such presence, however, is often not practical, as the deliveries tend to be made during office hours when most people are at work.

To address these concerns, some prior art locker systems have been developed. In one system, lockers are placed at or near residential sites. The storage units in the lockers have a coded locking mechanism which unlocks when a correct code is entered. The code changes with each use. For a customer to use the lockers to receive a purchased good, the customer inserts a set of coins or swipes a credit card reader which is attached to a locker unit. When the proper amount is registered, a code for opening the locker is given to the customer. The customer then calls the deliverer of the goods and gives him the code. The deliverer brings the purchased good to the locker site and uses the code to open the locker unit. After the good is placed inside the unit, the deliverer locks the unit by closing its door. The deliverer calls the customer to notify him that the good has been placed in the locker unit. To access the good, the customer enters the code to unlock the locker unit. After the unit has been accessed twice, the code is no longer valid.

Although this and other types of delivery systems exist, what is needed in the modern days of the internet and automated deliveries is a more robust delivery and pick-up system which is intelligent and flexible. Particularly, it would be desirable to have a system which can keep track of all transactions and transacted parties, and which is able to report status of transactions and intelligently keep payment data relating to the transactions. The system should also be reliable, safe and convenient to use. Such a system is currently not available.

SUMMARY OF THE INVENTION

A delivery transaction using the present invention typically involves four main parties: a customer who is a purchaser of a good; a vendor who is the seller of the good; a delivery agent who is the deliver of the good; and a system controller which is the facilitator of the delivery transaction. A pick-up transaction typically involves three main parties; a customer who wishes have a good picked-up; a vendor who picks up the good and performs a service on the good; and the system controller which is the facilitator of the delivery transaction.

The present invention is an intelligent and robust system for facilitating a delivery and pick-up of transported goods. In general, the present system facilitates a delivery and pickup of goods by providing a temporary transfer facility where the delivery and pickup occurs. The transfer facility will be placed at a location convenient to the customer which, in most instances, will be at high-density residential areas such as an apartment complex.

The transfer facility is an intelligent computer-controlled locker module which is remotely and wirelessly connected to a system controller. Each of the locker modules can both receive and send out signals to communicate with the system controller. The system controller is also linked with the customer's PC, the vendor PC, and the delivery agent's PC preferably via the internet. Via the internet linkage, the parties can handle various transactions such as registration, leasing, checking of status, etc.

Before a delivery can be made using the present system, the parties are first registered where each of the parties, the customer, vendor, and delivery agent, provides his particulars and registers a smart card and a pin number with the system controller. For the delivery agent, it registers itself as a company as well as the individual persons who will be making the delivery. The registered vendor then leases a locker unit of appropriate size from the locker module located near the customer's home via the internet. During the leasing process, the vendor provides the required details of the customer and the delivery agent so that the respective parties can access the leased locker unit. The vendor then notifies the registered delivery agent to deliver the good to the specified locker unit of the specified locker module. The delivery agent then sends a registered delivery person to the site of the locker module, who then uses a registered smart card to access the specified locker unit to drop off the good into the locker unit. The system controller then notifies the customer that the delivery has been made and that he should pick up the delivered good. The customer accesses the locker unit using his registered smart card and picks up the delivered good.

As for a pick-up transaction, the parties must also be first registered where each of the parties, the customer and vendor, provides his particulars and registers a smart card and a pin number with the system controller. For the vendor, it registers itself as a company as well as the pick-up persons who will be making the pick-up. After the registration, the registered vendor leases a locker unit of appropriate size from the locker module located near the customer's home via the internet. During the leasing process, the vendor provides the required details of itself and the customer so that the respective parties are able to access the leased locker unit. The system controller then notifies the customer that a locker unit has been reserved for him. The customer drops off the good in the locker unit per the system controller's message. The system controller then notifies the vendor that the good has been dropped off. The vendor picks up the good using a registered pick-up person.

DETAILED DESCRIPTION OF THE INVENTION

In general, the present system facilitates a delivery and pickup of goods by providing a temporary transfer facility where the delivery and pickup occurs. The transfer facility will of course be placed at a location convenient to the person picking up the good which, in most instances, will be at high-density residential areas such as an apartment complex. In the preferred embodiment, the transfer facility is an electronic locker module which provides selective access to the appropriate parties. The preferred embodiment of the present invention utilizes the concept of lease where the party wishing to use the locker for delivery or pickup "leases" a unit in the locker module on fixed short-term duration until the delivery or the pickup is made.

The operation of the present invention involves multiple parties. Typically, in a delivery scenario, the parties would include a customer, vendor, delivering agent, and the system controller. The customer is the purchaser of a good. The vendor is the seller of the good. The delivering agent is the entity which is responsible for delivering the good. And lastly, the system controller is the party who facilitates the transactions for the delivery to occur.

In a typical pick-up situation, the parties would include a customer, vendor, pick-up agent, and the system controller. Here, the customer is the party wishing to have something picked up, e.g., laundry. The vendor, e.g., laundromat, is the party wishing to receive the picked-up good. The pick-up agent is the party responsible for transporting the goods from the pick-up point to the vendor. And lastly, the system controller is the party who owns the locker units and who also facilitates the transactions for the pick-up to occur.

Although in general the parties are separate and independent, in some situations, a party can take on multiple identities. For instance, in the case of the delivery scenario, a large seller of goods such as Compaq Corp. may both be a vendor and a delivering agent, provided that the vendor also has the facility for delivery. In the case of laundry pick-ups, the party picking up the laundry can be both the vendor (the party who will be doing the laundry) and the pick-up agent. Also, one party may make up multiple entities. For instance, a delivery agent such as Federal Express may have many delivery persons, each of whom must be registered with the system controller.

Figure 1:
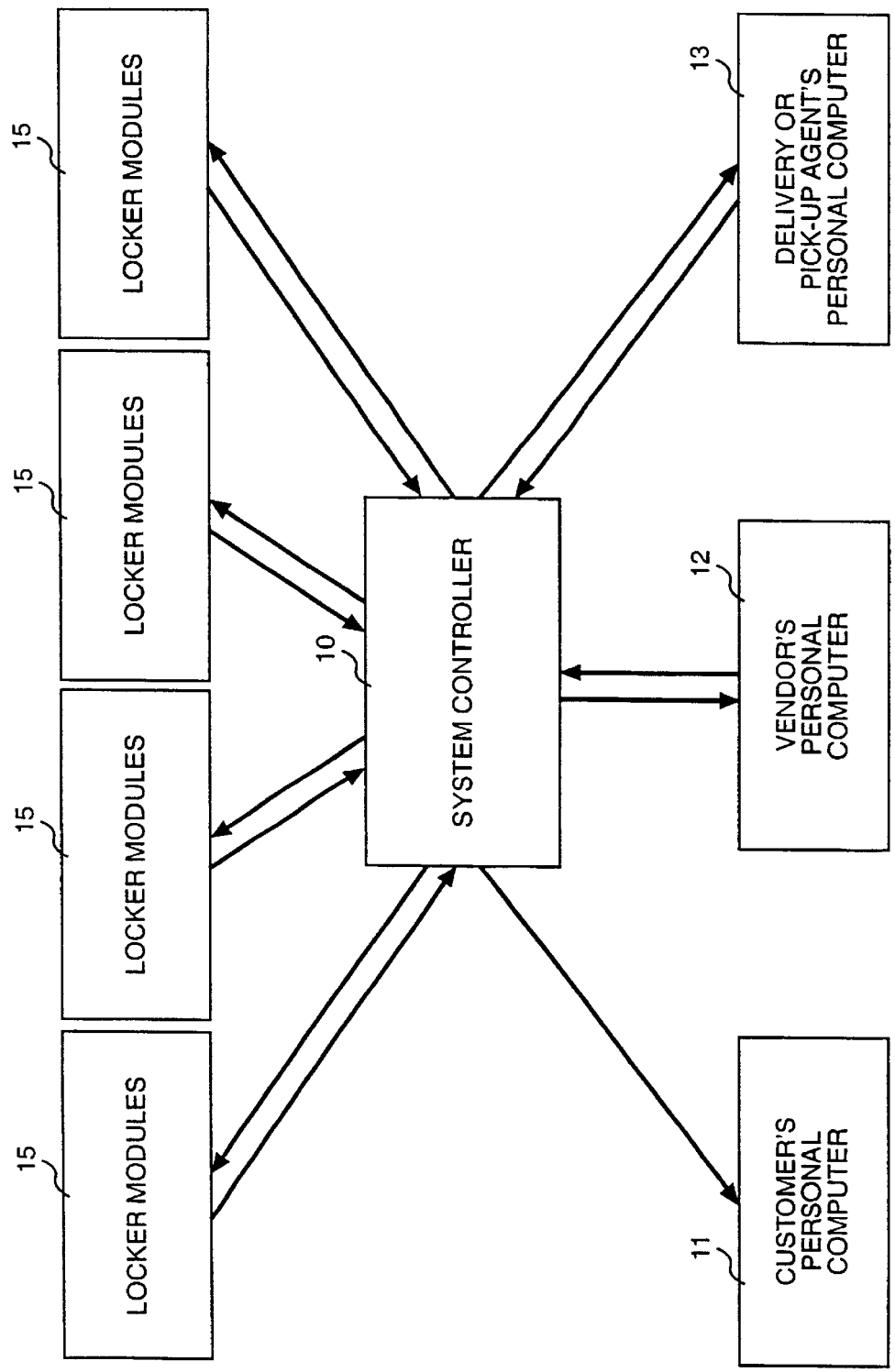
FIG. 1 is an overall block diagram illustrating the preferred embodiment of the present delivery and pick-up system.

FIG. 1 illustrates the overall system block diagram illustrating the preferred embodiment of the present invention. In this embodiment, the system controller 10 is remotely and wirelessly linked up with each of the locker modules 15 which are dispersed throughout a particular region. Each of the locker modules 15 can both receive and send out signals to communicate with the system controller 10. The system controller 10 is also linked with the customer's PC 11, the vendor PC 12, and the delivery and pick-up agents' PC 13. In the preferred embodiment, the system controller 10 is linked to the PCs via the internet. Via the internet linkage, the parties can handle various transactions such as registration, leasing, checking of status, etc.

Figure 2:
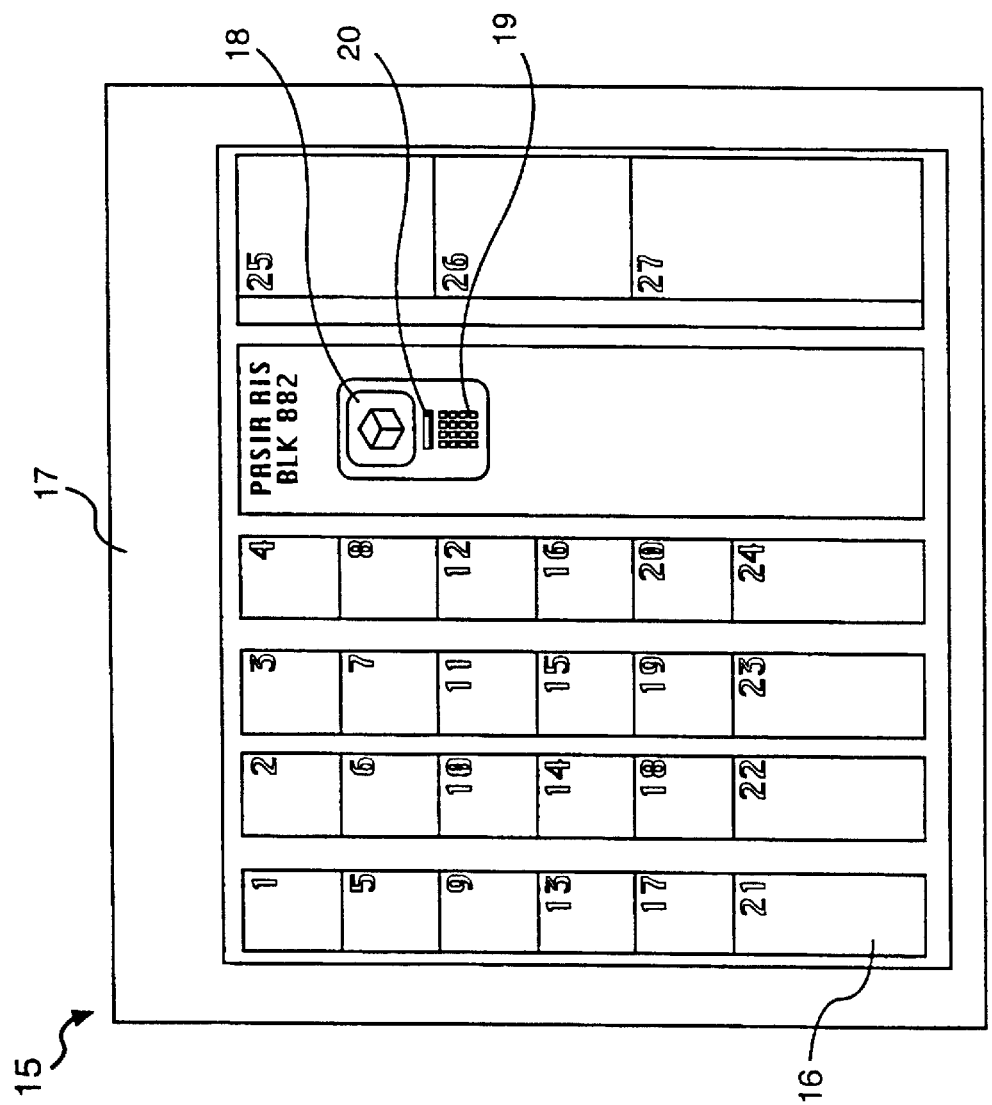
FIG. 2 illustrates the physical layout of a locker module.
Figure 3A:
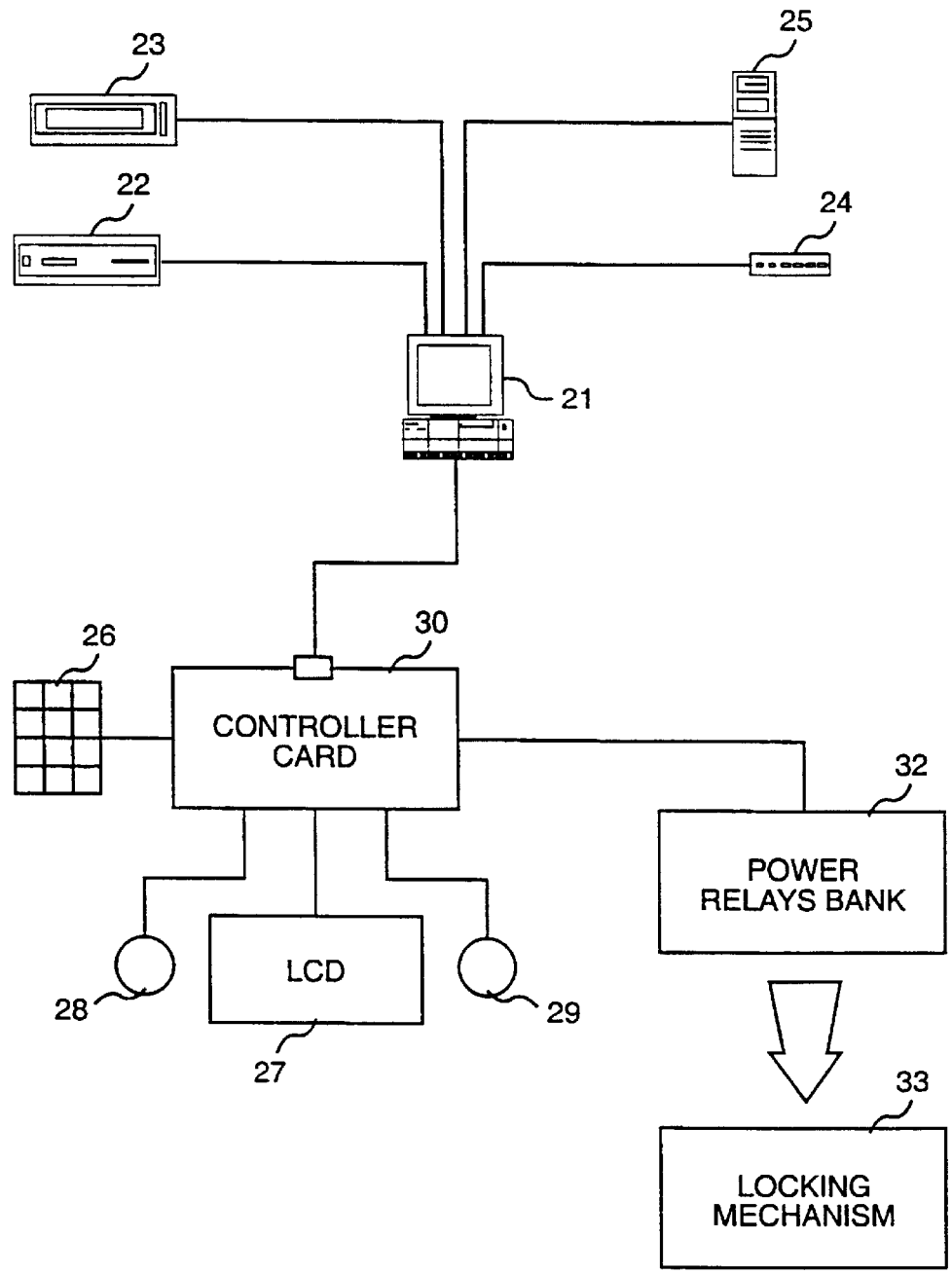
FIG. 3A is a schematic block diagram illustrating the circuitry components of the locker module shown in FIG. 2.

FIG. 2 illustrates the physical layout of the locker module 15 and FIG. 3A illustrates the schematic block diagram of the circuitry for the locker module 15. First referring to FIG. 2, the locker module 15 generally has a sturdy frame 17 and a plurality of locker units 16 with heavy duty security doors which are numbered for easy reference. Each of the doors has a locking mechanism which is controlled by the locker module's main controller. The locker module 15 also comes with a computer monitor 18 with a keypad 19 and a card slot 20. In the preferred embodiment, the card slot is adapted to receive smart cards, but can alternatively be made to receive other types of cards such as credit cards, debit cards, etc. Enclosed within the walls of the locker module 15 is the circuitry for controlling the operation of the locker module (shown in FIG. 3A). The locker modules may optionally carry a camera for recording an image of a person using said locker module.

FIG. 3A illustrates in a schematic block diagram, the circuitry for controlling the operation of the locker module which includes a main controller PC 21 which is basically a computer apparatus which will be the locker module controller for handling the logical functions of the locker module. The controller PC 21 has an embedded database which is capable of storing data relating to a transaction. The controller PC 21 is linked to a smart card reader 22 and motorised card acceptor 23 for accepting and reading smart cards. The controller PC 21 is also linked to a wireless modem 24 which can send and receive wireless signals. Although various wireless or wired communication technology such as SMS (short messaging service), paging, radio frequency may be employed, in the preferred embodiment, a wireless Mobitex® modem which employs a proprietary RF technology is used.

Still referring to FIG. 3A, the controller PC 21 is further linked to a controller card 30 which interfaces the main controller PC with the keypad 26, left and right momentary switches 28 and 29, respectively, and an LCD monitor screen 27. The keypad 26, and the left and right momentary switches 28 and 29 are basically input devices for the locker module and the LCD monitor 27 is for display of user information and instructions. The controller PC 21 is further linked to the locking mechanism 33 via the controller card 30 and power relays bank 32 which provide interfacing between the controller PC 21 and the locking mechanism 33 such that the controller PC has full control to lock and unlock the locking mechanism 33 of each locker unit.

Although a specific implementation was shown in FIG. 3A, it should be understood that this implementation is illustrative only, and is in no way representative of the only way the present locker module may be implemented. For instance, although in the preferred embodiment, a smart card system is used, it should be understood other types of credentialing method which can uniquely identify an individual may be possible. A smart card is a relatively recent device which is a plastic card with a microchip attached to it. As a standard, each smart card has a unique serial number associated with it which is extracted by the present system. By associating a smart card and a pin number to an individual, the smart card is able to uniquely identify a person. Similarly, an identification system such as fingerprint recognition system which can uniquely identify an individual may be used as an alternative to the present smart card system.

Figure 3B:
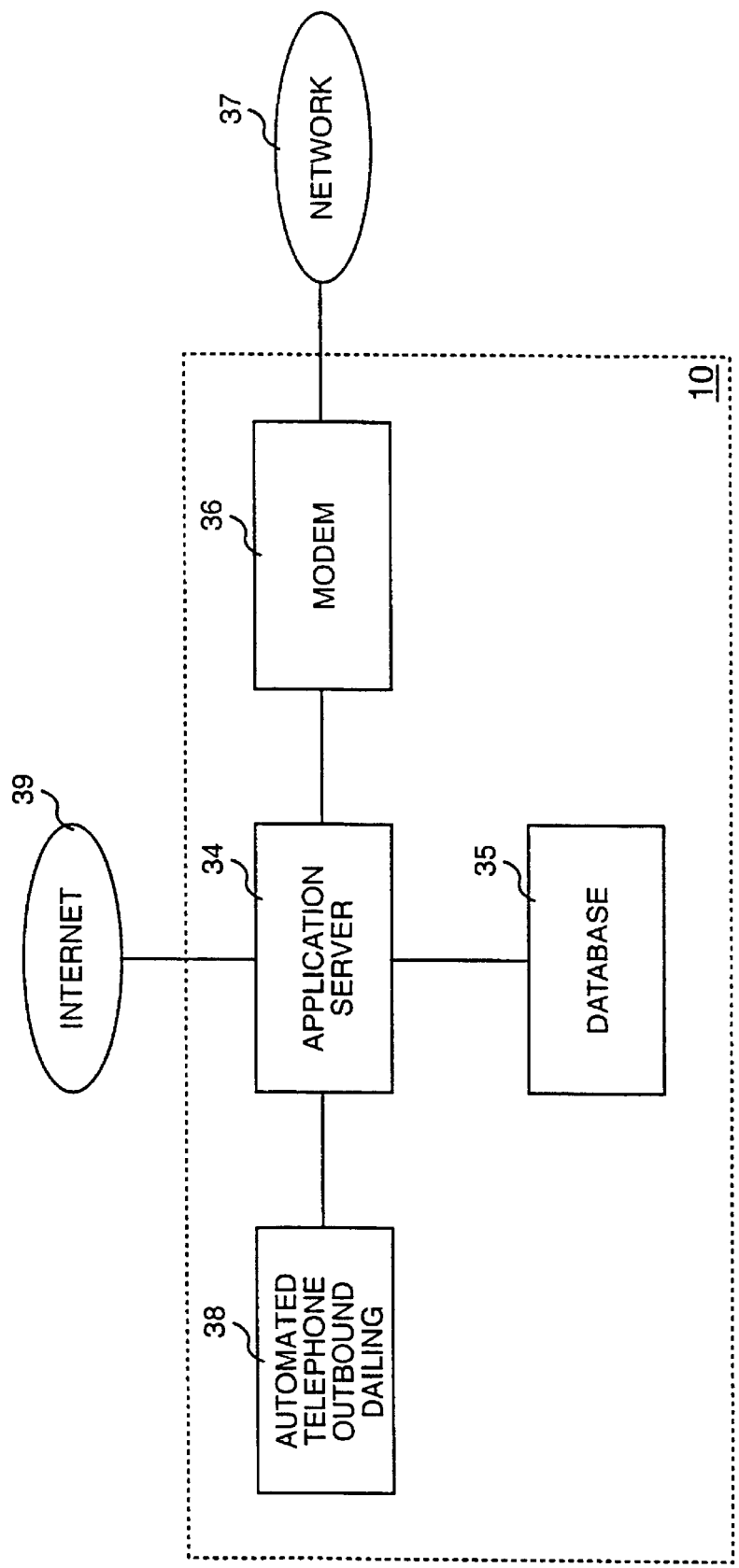
FIG. 3B is a block diagram illustrating the system controller.

FIG. 3B illustrates in a block diagram, the components of the system controller 10 which includes an application server 34 and a database 35. The application server contains all of the programs for controlling the delivery and pick-up system, and the database stores data. Some data is stored in the database of the system controller while some data is stored in the embedded database of the locker module controller PC depending on its use. The data stored in the embedded database is periodically backed up to the system controller's database. The application server 34 is linked to Mobitex® modem 36 which is linked to a public wireless network 37 such that it communicates with modem 24 of the locker module (FIG. 3A). The application server is also linked to an automated telephone outbound dialing system 38 such that voice messages can be sent automatically via the telephone. Lastly, the application server is connected to the internet 39 so that customers, vendors, delivery agents, and the like, can access the system controller website.

Figure 4:
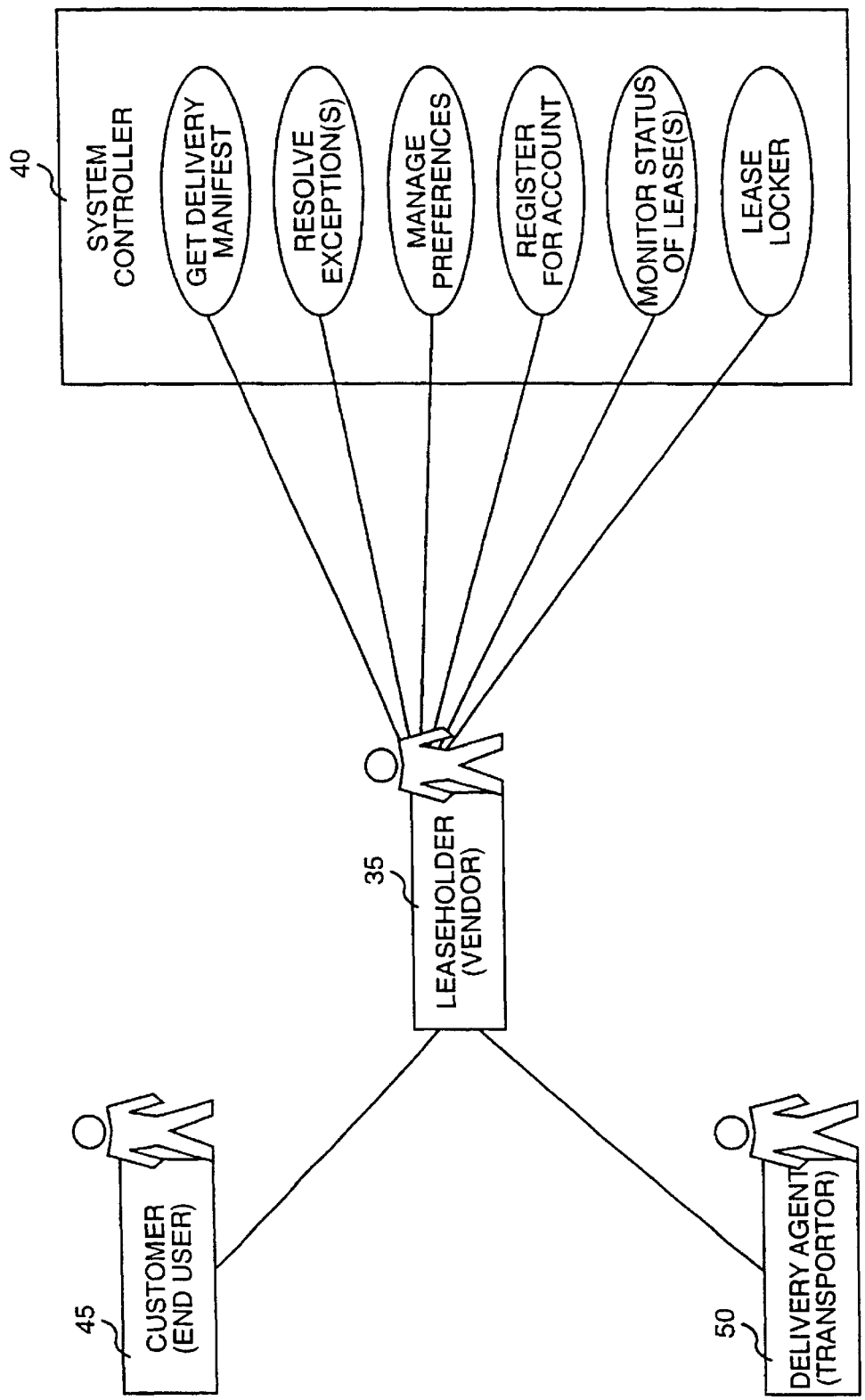
FIG. 4 is a diagram showing the relationships of the parties involved in a delivery transaction.

To more clearly illustrate the operation of the present invention, it is useful to define the role of each party and its relationship to the role played by another party as illustrated in FIG. 4. FIG. 4 illustrates a typical delivery scenario where the vendor 35 is the leaseholder, the customer 45 is the end user, and a third-party delivery agent 50 is the transporter of the goods. The most important of the roles, in a sense, is that of the "leaseholder." The leaseholder is the party who "leases" a unit in the locker module. In the preferred embodiment of the present invention, either the vendor or the delivery agent can play the role of the leaseholder, though typically, the vendor will be the leaseholder.

As illustrated in FIG. 4, the leaseholder 35, in this case the vendor, has leased a locker unit from the system controller 40 hence it has a direct relationship with the system controller 40. The leaseholder also has a direct relationship with the customer/end user 45 as it has sold goods to him. The leaseholder 40 further has a direct relationship with the delivery agent 50 as the vendor has hired the agent 50 to make the delivery of the purchased good to the leased locker unit.

The role of the system controller 40 always remains the same—as the facilitator of the transactions. Some of the system controller's main duties are shown in FIG. 4. Among others, the system controller facilitates the registration all of the parties onto its system. It facilitates the leasing of the locker unit to the leaseholder. It also receives the delivery and pick-up manifests, resolves any exceptions, manages preferences, and monitors the status of the lease and the locker module.

Figure 5:
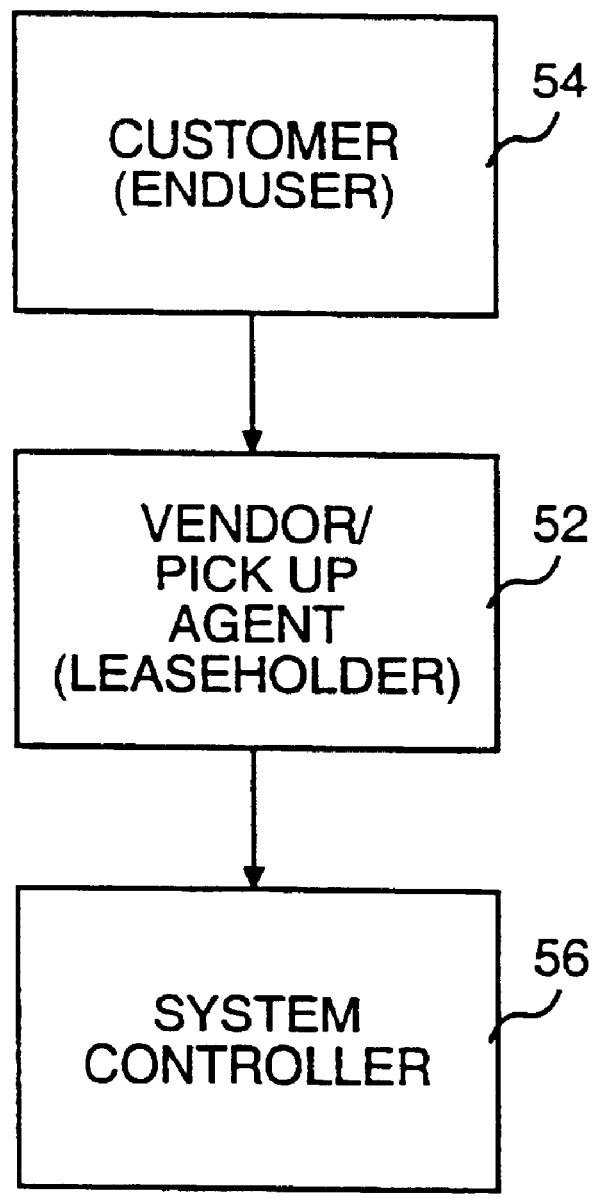
FIG. 5 is a diagram showing the relationships of the parties involved in a pick-up transaction.

FIG. 5 illustrates a typical pick-up scenario such as a situation where a customer wants a laundromat to pick up his laundry to be cleaned. As shown in FIG. 5, in this scenario, the vendor 52 is also the pick-up agent, and takes on the role as the leaseholder. The customer 54 is again the end user. The vendor 52 has a direct relationship with the system controller 56 as it leases a locker from it. The vendor 54 also has a direct relationship with the customer 54 as it performs a service on the picked-up good.

Figure 6:
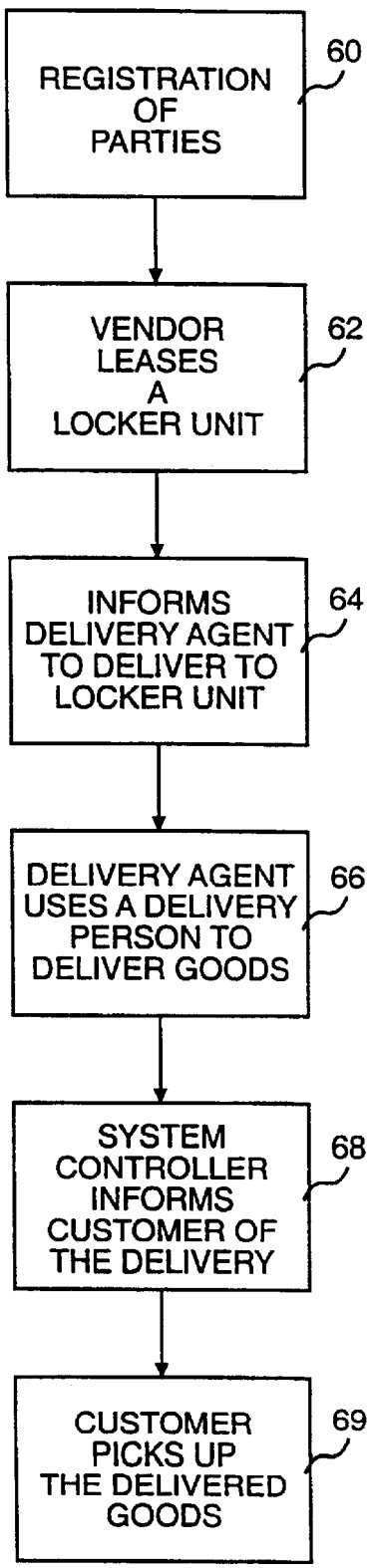
FIG. 6 is a simplified flow diagram illustrating the steps for facilitating a delivery transaction.

A flow diagram illustrating the general process flow for facilitating a delivery for the scenario shown in FIG. 4 is shown in FIG. 6. This is a scenario where a customer buys a good from a vendor, and the customer wishes the good to be delivered to his home while no one will be present to receive the good. A locker module of the present invention is located near the customer's home, and he wishes the vendor to deliver the good to the locker module. The vendor will be using an independent delivery agent for the delivery. The FIG. 6 provides only an overview of the delivery transaction; the details of each of the steps in FIG. 6 shall be provided further below.

Referring now to FIG. 6, in step 60, the parties are first registered where each of the parties, the customer, vendor, and delivery agent, provides his particulars and registers a smart card and a pin number with the system controller. For the delivery agent, it registers itself as a company as well as the individual persons who will be making the delivery.

In step 62, the registered vendor leases a locker unit of appropriate size from the locker module located near the customer's home via the internet. During the leasing process, the vendor provides the required details of the customer and the delivery agent so that the respective parties can access the leased locker unit. In step 64, the vendor then notifies the registered delivery agent to deliver the good to the specified locker unit of the specified locker module. In step 66, the delivery agent sends a registered delivery person to the site of the locker module, who then uses a registered smart card to access the specified locker unit to drop off the good into the locker unit. In step 68, the system controller notifies the customer that the delivery has been made and that he should pick up the delivered good. Alternatively, or in conjunction, the delivery agent may notify the customer that the delivery has been made. In step 69, the customer accesses the locker unit using his registered smart card and picks up the delivered good.

Figure 7:
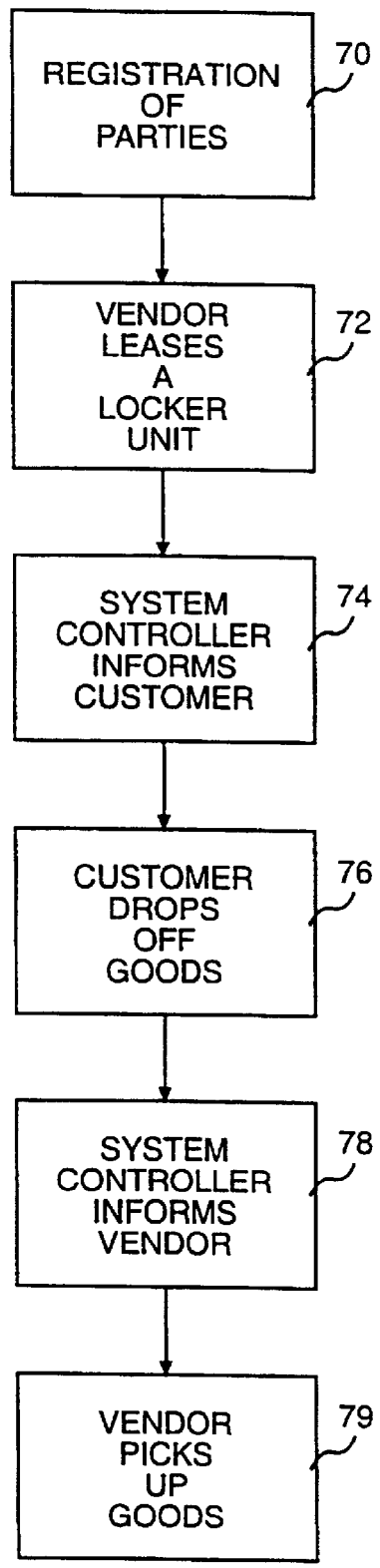
FIG. 7 is a simplified flow diagram illustrating the steps for facilitating a pick-up transaction.

A flow diagram illustrating the general process flow for facilitating a pick-up for the scenario shown in FIG. 5 is shown in FIG. 7. This is a scenario where a customer wants a vendor to pick up a good such as laundry or a broken item to be cleaned or repaired. But the vendor only operates during hours when the customer will not be present at home to hand over the good. A locker module of the present invention is located near the customer's home. The vendor will be sending someone from his company to pick up the good. FIG. 7 provides only an overview of the pick-up transaction; the details of each of the steps in FIG. 7 shall be provided further below.

Now referring to FIG. 7, in step 70, the parties are first registered where each of the parties, the customer and vendor, provides his particulars and registers a smart card and a pin number with the system controller. For the vendor, it registers itself as a company as well as the individual persons who will be making the pick-up.

In step 72, the registered vendor leases a locker unit of appropriate size from the locker module located near the customer's home via the internet. During the leasing process, the vendor provides the required details of itself and the customer so that the respective parties are able to access the leased locker unit. In step 74, the system controller notifies the customer that a locker unit has been reserved for him. Alternatively, or in conjunction, the vendor notifies the customer of the same. In step 76, the customer drops off the good in the locker unit per the system controller's message. In step 78, the system controller notifies the vendor that the good has been dropped off. Alternatively, or in conjunction, the customer notifies the vendor of the same. In step 79, the vendor picks up the good using a registered pick-up person.

Now the details of the steps shown in FIG. 6 and FIG. 7 shall be described. The process for the registration steps 60 and 70 of FIGS. 6 and 7, respectively, is identical and hence the following description will apply to both. The purpose of the registration is basically to uniquely identify a party. In the preferred embodiment, there are two basic types of registration: one for corporate users, and one for individual users. In most cases, the individual will be the customer and the corporate users will be the vendor and delivery agents. In the preferred embodiment, the registration process will be conducted via a website through the internet, though clearly, other modes of communication is clearly possible.

Figure 8:
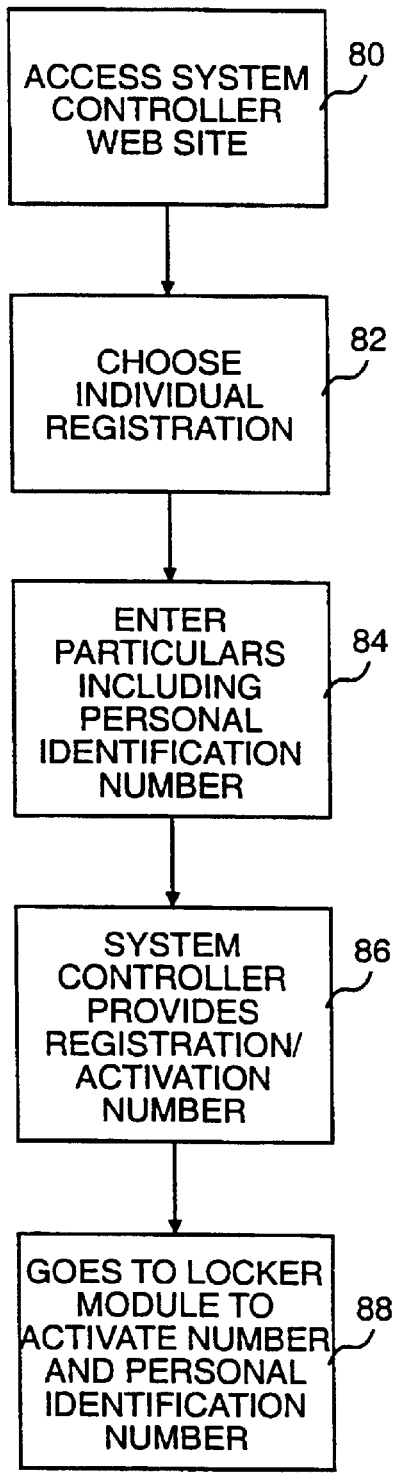
FIG. 8 is a flow diagram illustrating the steps for registering an individual user of the present system.
Figure 9A:
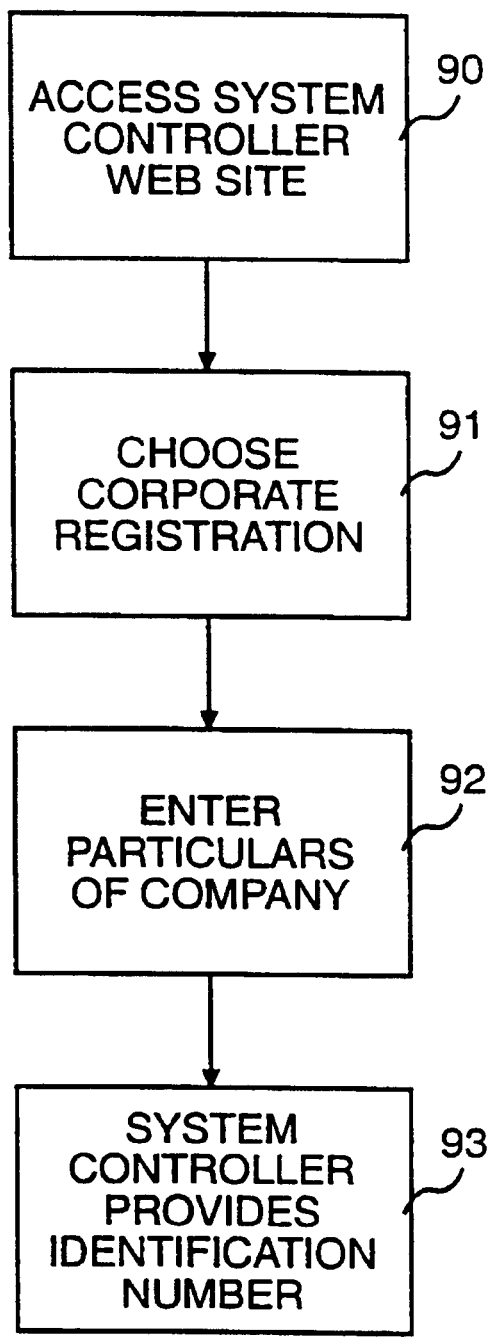
FIG. 9A is a flow diagram illustrating the steps for registering a corporate user of the present system.

FIG. 8 illustrates the process for the individual registration and FIG. 9A illustrates the process for the corporate users. Referring first to FIG. 8, in step 80, the individual user accesses the website of the system controller. In step 82, the user chooses the option for individual registration. In step 84, the user enters his particulars in the provided fields. The particulars may include information such as name, address, e-mail address, phone number, etc. In the preferred embodiment, the particular also includes login name and password or pin number. When all of the requested particulars are submitted, the system controller provides to the user a registration ID (or login ID) and an activation code in step 86. Once the registration ID and activation code are obtained, the user goes to a locker module site with a smart card in step 88. At the locker module site, using his pin number and the activation code, the individual user activates his smart card per the steps shown in FIG. 10 and explained below.

Referring now to FIG. 9A, the corporate user registration process begins in step 90 where the corporate user accesses the system controller's website. In step 91, the user then chooses the corporate registration option. In step 92, the user enters the corporate particulars which may include corporation's name, address, contact person, phone number etc. In the preferred embodiment, the particulars also include login name and a password or pin number. Once the requested information is entered and submitted, the system controller provides the corporate user an identification number identifying the corporation. The corporate user is now registered. The corporate user's registration process may be used either by the vendor or the delivery agent.

Figure 9B:
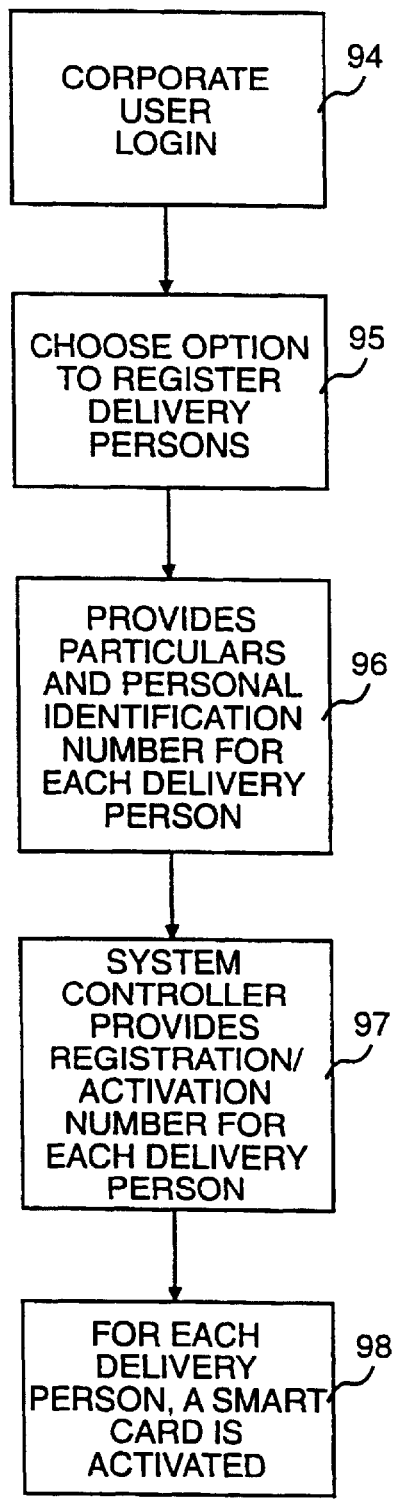
FIG. 9B is a flow diagram illustrating the steps for registering a corporate user's delivery persons.

Although after executing the steps in 9A the corporate user is registered, the corporate user may still need to register its delivery persons. This is particularly true if the corporate user is a delivery agent such as UPS or DHL where delivering goods is its main function. However, even if the corporate user is a vendor such as Compaq or IBM where its main function is not necessarily delivery, it may still wish to register its delivery persons if the corporation offers a delivery service. FIG. 9B illustrates the steps for registering the delivery persons.

Referring to FIG. 9B, in step 94, the registered corporate user logins at the system controller's website using its login name and password. If the proper login name and password are entered, the user is given access to various options. In step 95, the corporate user chooses the option to register its delivery persons. In step 96, the corporate user provides the particulars of each of the delivery persons in the fields provided. The particulars may include name, address, etc. In the preferred embodiment, the particulars also include a pin number. Once all of the requested information is submitted, the system controller provides an registration/activation code for each of the delivery persons in step 97. Once the activation code is obtained, a set of smart cards is taken to a locker module site in step 98. At the locker module site, using the pin numbers and the activation codes, the corporate user activates the smart cards per the steps shown in FIG. 10 below.

Figure 10:
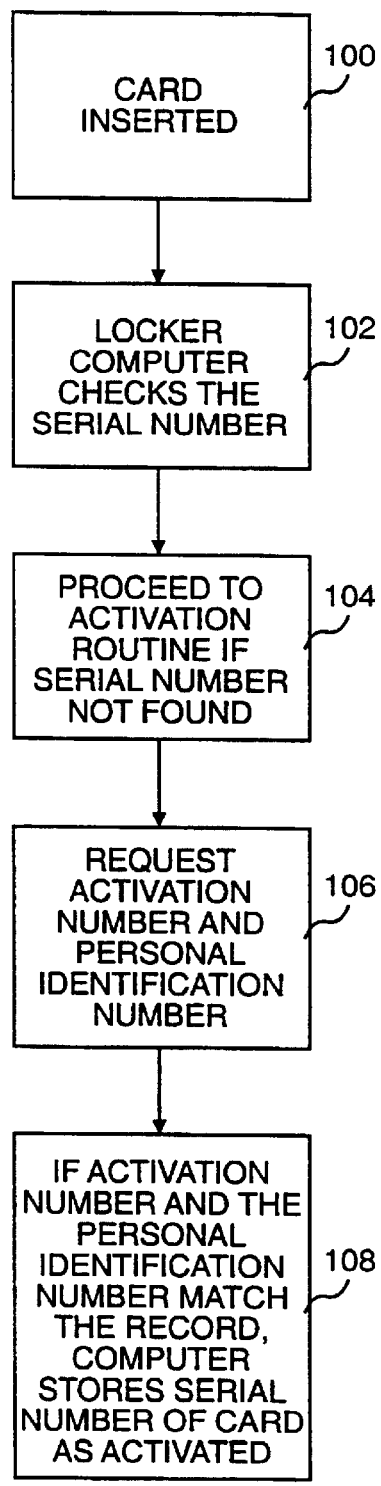
FIG. 10 is a flow diagram illustrating the steps for activating a smart card at a locker module site.

The smart card activation process shown in FIG. 10 applies equally to delivery persons as well as individual users. Referring now to FIG. 10, in step 100, the smart card activation process begins by inserting the card into the provided card slot of the locker module. The locker module controller then, in step 102, reads the unique serial number of the smart card and checks against the appropriate database located either at the system controller site or at the locker module. The activation process only proceeds if the serial number does not exist in the database in step 104 (what happens if the serial number does exist in the database shall be explained later below). If it is found that the serial number does not exist, then the locker module controller requests the activation code and the pin number on the monitor, and the requested information is entered in step 106. The controller remotely checks the code and pin number in the database, and if they are matched, the card is activated, and the serial number of the activated smart card is stored in the database.

For the corporate users, a subscription process may optionally be employed after the registration. The subscription process is basically a scheme by which the corporate users choose a particular region of coverage. If the subscription process is employed, the corporate users may only lease the locker modules which are located within the subscribed region. The system controller may base the subscription fee based on the extent of the region of coverage.

Figure 11:
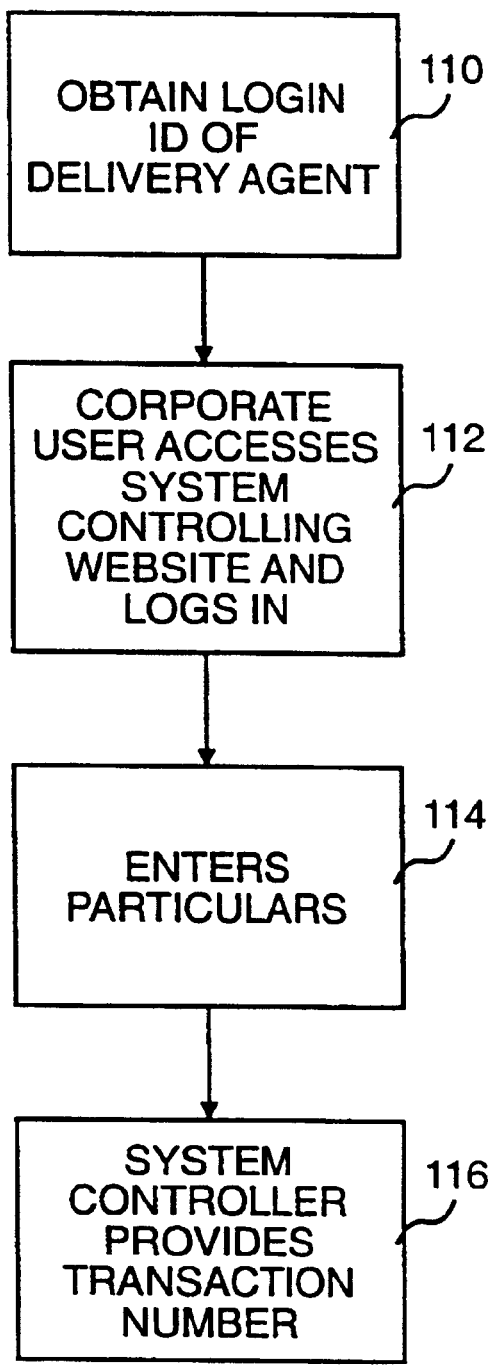
FIG. 11 is a flow diagram illustrating the steps for reserving a locker unit.

Referring to steps 62 and 72 in FIGS. 6 and 7, respectively, once the parties are registered per the steps shown above a locker unit may be leased by a corporate user. FIG. 11 illustrates the preferred process for a corporate user to lease a locker unit. In step 110, the corporate user obtains the login identification number (or "login ID") of its customer and the delivery agent. The delivery person's login identification number need not be known at this point, but may be entered if it is available. In step 112, the corporate user accesses the system controller's website, enters the proper login ID and password, and chooses the option to reserve a locker unit. In step 114, the corporate user provides the particulars requested by the system controller. In the preferred embodiment, the particulars are customer's login ID, the delivery agent's login ID, the location of the locker module, size of the locker unit needed, the date of the lease, and an indication as to whether leasing will be for delivery for pick-up. A pre-made set of selections may be provided for the location of the locker module and the size of the locker unit. For a pick-up situation where the vendor is also he pick-up agent, or a delivery situation where the vendor is also the delivery agent, the delivery person's ID may be known at this time, and may be entered. Once, all of the information is provided, the system controller provides the corporate user with a transaction number in step 116 and reserves the designated locker unit and the designated locker module at the designated date. The lease is good for a fixed duration, and in the preferred embodiment, for twelve hours.

The details of the registration and leasing processes for a delivery and pick-up were generally the same and they were discussed together above. But because the rest of the steps are sufficiently different for a delivery and pick-up, the details of the rest of the steps in FIGS. 6 and 7 shall be discussed separately. The delivery process shall first be described in detailed followed by the pick-up process. Now first referring to step 64 of FIG. 6 (the delivery flow diagram), if the reserved locker unit is for delivery, the vendor notifies the delivery agent of the delivery. Besides the usual information provided to a delivery agent, e.g., company particulars, the vendor provides the transaction number to the delivering agent.

Now referring to step 66 of FIG. 6, using the transaction number, the delivery agent accesses the vendor's locker reservation request site on the system controller's website. From the site, the delivery agent is able to ascertain the both the location and the time of delivery as the transaction number will allow it to access the lease information. Once there, the delivery agent enters the login ID of the delivery person who will be making the delivery to complete the lease transaction. All of the lease information is sent by the system controller to the locker module carrying the leased locker unit. The locker module controller then uses the information to provide selective access to the leased locker unit. To make the delivery, the designated delivery person takes his designated smart card to the designated locker module site on the designated date. Once there, he inserts the card into the slot provided. The locker controller reads the unique serial number of the card and after conducting a series of checks (to be explained later) asks for the delivery person's pin number on the monitor. The locker controller opens the leased locker unit only if the proper pin number is entered via the provided keypad.

Now referring to step 68 of FIG. 6, once the delivery is made and the leased locker unit's door is properly closed, the status of the transaction is remotely sent by the locker controller to the system controller. The system controller is now aware that the delivery has been made. The system controller then notifies the customer that the delivery has been made and that the good is ready to be picked up. The message may be delivered to the customer in various ways such as e-mail, an automated telephone call, fax, etc. However, in the preferred embodiment, an automated telephone call is made to the customer which plays an automated voice message. The automated message notifies the customer the location of the locker module, the locker unit number, and the time period for which the pick-up can be made.

Now referring to step 69 of FIG. 6, after the customer receives the message that the good is ready, the customer goes to the locker module site with his smart card which he has activated during the registration process. Once at the locker module, he slips the card into the provided slot. The locker controller reads the serial number of the card and after conducting a series of checks, asks for customer's pin number on the monitor. The locker controller opens the leased locker unit only if the proper pin number is entered via the provided keypad. After the good is picked up by the customer, the status is transmitted by the locker controller back to the system controller. The delivery transaction is now completed.

Referring to FIG. 7, now the details of the rest of the steps for the pick-up process will be described. Referring to step 74 of FIG. 7, after the vendor has leased a locker unit, the system controller notifies the customer that the locker unit is ready to receive the good to be picked up. The message may be delivered to the customer in various ways such as e-mail, an automated telephone call, fax, etc. However, in the preferred embodiment, an automated telephone call is made to the customer which plays an automated voice message. The automated message notifies the customer the location of the locker module, the locker unit number, and the time period for which the drop off can be made.

Now referring to step 69 of FIG. 6, after the customer receives the message that the locker unit is ready, the customer goes to the locker module site with his smart card which he has activated during the registration process. Once at the locker module, he slips the card into the provided slot. The locker controller reads the serial number of the card and after conducting a series of checks, asks for customer's pin number on the monitor. The locker controller opens the leased locker unit only if the proper pin number is entered via the provided keypad. After the good is dropped off by the customer, the status is transmitted by the locker controller back to the system controller. The good is now ready to be picked up by the pick-up agent.

Referring to step 78 of FIG. 7, after the customer has dropped off the good, the system controller notifies the vendor that the good is ready to be picked up. The message may be delivered to the vendor in various ways such as e-mail, an automated telephone call, fax, etc. However, in the preferred embodiment, an e-mail is sent if one is available.

Now referring to step 79 of FIG. 7, after the vendor receives the message that the good is ready to be picked up, the vendor assigns a pick-up person who has been registered with the system controller. The pick-up person goes to the designated locker module site with his designated smart card which he has activated during the registration process. Once at the locker module, he slips the card into the provided slot. The locker controller reads the serial number of the card and after conducting a series of checks, asks for the pick-up agent's pin number on the monitor. The locker controller opens the leased locker unit only if the proper pin number is entered via the provided keypad. After the good is picked up by the pick-up person, the status is transmitted by the locker controller back to the system controller. The pick-up transaction is now completed.

For the delivery and the pick-up transactions to occur smoothly and safely, the system controller in conjunction with the locker module controller performs a number of administrative tasks both during and apart from the transactions which shall now be described.

The system controller maintains a large database of the registered users. The database is well catalogued so that the particulars of the users can be readily accessed. During the registration process, the system controller ensures that no identical login names exist. Also, during the smart card activation process, the system controller ensures that a smart card having a serial number which already exists in the database cannot be re-activated.

When a locker reservation is requested, the system controller checks the integrity of all of the necessary entered particulars. First, it ensures that the corporate user making the reservation is properly registered by matching the login name and the password with that in the system controller's database. Same is done for the entered customer's ID, delivery agent's ID, and the delivery person's ID. When the locker module and the locker unit size are specified, the system controller checks against other reservations to make certain of its availability. If the locker unit is not available, the corporate user is so notified.

When the corporate user makes a selection as to the type of transaction, e.g., pick-up or delivery, the system controller defines a set of expected actions from the expected parties. So for instance, if "delivery" is selected as the transaction (and assuming that the delivery person's ID has been properly entered), the first expected action would be defined as the delivery person making the delivery at the designated locker module during a period assigned for the lease. Therefore, when the correct delivery person slots in his designated smart card at the designated locker module, access will be given to the reserved locker unit. After the delivery, the next expected action is for the designated customer to pick up the good from the locker unit. Hence, when the correct customer slots in his designated smart card at the designated locker module, access will be given to the reserved locker unit. If, however, the correct customer were to attempt to access the locker unit before the delivery is made, the event would not correspond to the expected action, and therefore, access to the locker unit would not be provided even though the correct customer slotted in the correct smart card at the correct location.

Similarly, if the chosen transaction were a "pick-up", the first expected action would be for the designated customer to drop off the good at the designated locker module site. The next expected action would be for the designated pick-up person to pick up the good at the same site. Hence, any action which would be contrary to this set of expected action would be rejected by the locker module.

Figure 12:
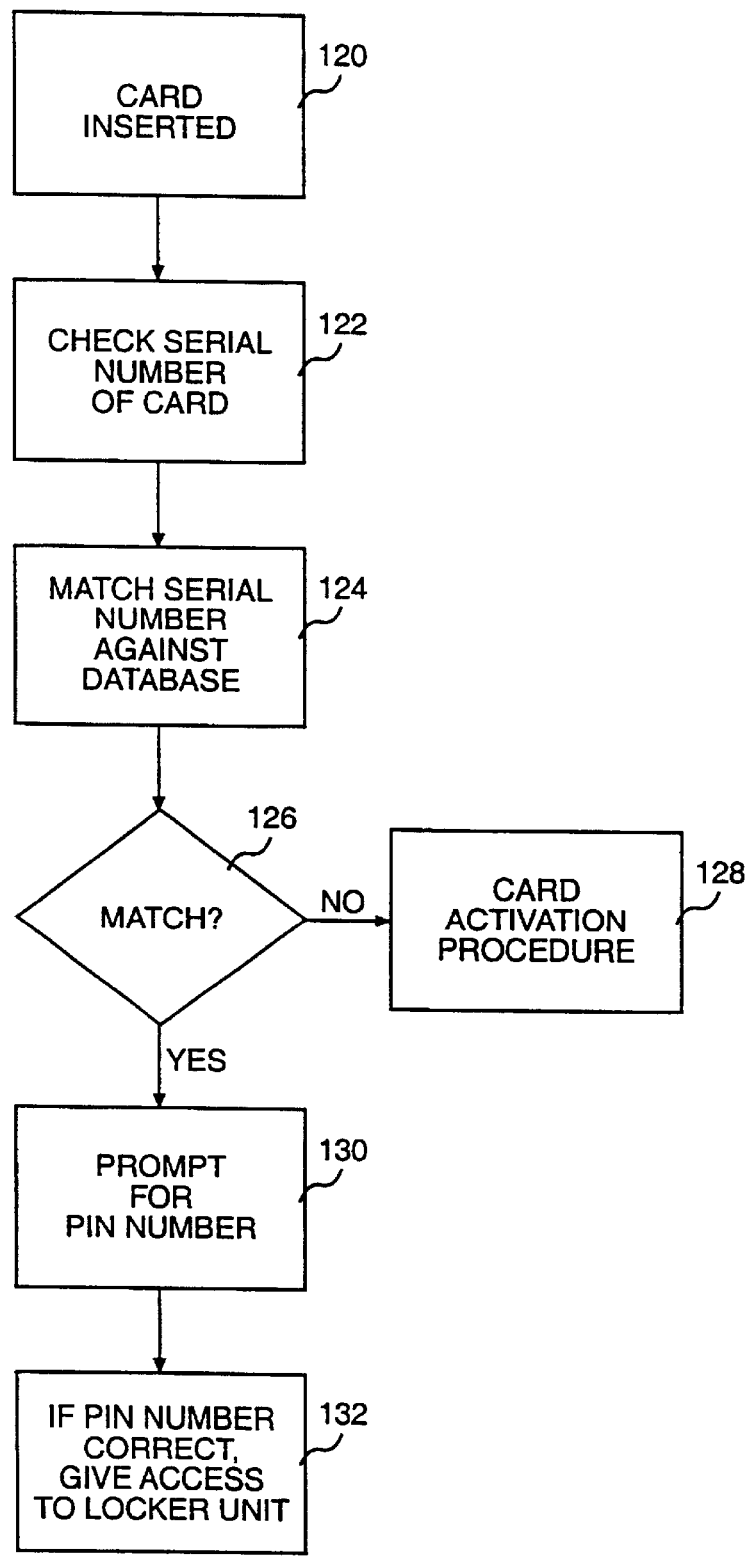
FIG. 12 is a flow diagram illustrating the algorithm employed by the system controller and locker module controller whenever a smart card is inserted into a locker module.

Moreover, for each time a smart card is inserted into a locker module's smart card slot, the system controller in conjunction with the locker module controller conducts a check to ensure that a proper procedure is followed. For instance, among other things, this check ensures that when a new user's smart card is entered, the locker module controller follows the procedure for activating the card. The flow diagram illustrating the preferred process is shown in FIG. 12. First, in step 120, the smart card is inserted into the reader. The serial number of the smart card is then read in step 122. The serial number is then matched against the appropriate database, usually the database in the locker module, to see if any pending transaction exists. If a match is not found in step 126, then the card activation procedure is followed (unless the card has already been activated previously). If a match is found in step 126, the pin number is prompted in step 130. If the entered pin number is correct, access is given to the locker unit in step 132.

The system controller also performs the function of notifying the various parties of the status of the locker unit. The various times at which this notification is given was described above. As described above, the preferred method of notification to the customer is by automated voice message. The notification is deemed successful when an automated telephone call is received by a person and the person correctly enters his pin number when it is prompted. If the notification is not successful, then several additional attempts are made. If the none of the attempts are successful, and the lease period of the locker unit runs out without the transaction being completed, the leaseholder is contacted. The leaseholder may renew the lease at this point or take other actions such as cancelling the order with the customer, if necessary.

The system controller keeps track of all transactions and stores the transaction details in its databases. Some are stored in the database of the system controller while some data is stored in the embedded database of the locker module controller PC depending on its use. The data stored in the embedded database is periodically backed up to the system controller's database. If at any time, a user wishes to obtain the status of a transaction, he may do so by accessing the system controller's website and choosing the status option. In addition, the system controller stores all past transactions of a limited period. Hence, if a delivery agent, for instance, wishes to obtain a delivery record of a particular delivery person, it may do so. The corporate user can also update any delivery person details at the website.

The system controller also keeps track of the payments on a lease-by-lease basis. Although a number of payment schemes are possible using the present system including deducting payment from the smart card at the locker module site, the preferred embodiment of the present invention charges a payment only to the leaseholder by keeping track of the number of locker reservations made and billing the leaseholder on a billing cycle.

The system controller has a procedure for a number of events which are deviant from the norm. For instance, if a delivery person makes a wrong delivery and needs to access the locker unit again, a recovery procedure is followed where the delivery person or the delivery agent must call the system controller to allow the delivery person special access to the locker unit. Similar procedure is followed if a customer were to place the wrong items in the locker unit during a pick-up transaction (here the customer can call the vendor who would then call the system controller). if the expected delivery or pick-up is not made within the expected time frame, the leaseholder is contacted to renew the lease.

If at any point the system controller loses communication with a locker module, it determines the source of the problem by checking the communication status of the other locker modules. If it is deemed that the source of the problem is at a particular locker module, a serviceman is sent to rectify the problem.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims and all changes which come within the meaning and range of equivalency of the claims are, therefore, to be embraced therein.

I claim:

1. A system for facilitating a delivery and pickup of goods comprising:

a plurality of locker modules, each of said locker modules having a plurality of locker units, a locker controller, a user interfacing device, a user-identifying device, and a remote receiving and transmitting device;

a system controller independent from the plurality of locker modules, the system controller having an application server, a database server, and a remote receiving and transmitting device for communicating with said remote receiving and transmitting device of said locker modules;

a customer's PC terminal communicably connected to said system controller;

a vendor's PC terminal communicably connected to said system controller; and a delivery agent's PC terminal communicably connected to said system controller;

wherein said system controller is adapted to facilitate leasing of said locker units by registered parties for delivery or pickup of a good, said registered parties including a customer, a vendor and a delivery agent.

2. The system as recited in claim 1, wherein said system controller is further adapted to provide login identification to each of said registered parties based upon particulars received from said registered parties, said login identification being associated with a smart card and a pin number of each of said registered parties.

3. The system as recited in claim 2, wherein said system controller is further adapted to provide said pin number and information on said smart card to said locker controller for said leasing.

4. The system as recited in claim 1, wherein said system controller is further adapted to enable said registered parties to obtain status of said delivery or said pickup, said status comprising a delivery record of a particular delivery person and transaction details.

5. The system as recited in claim 1, wherein said system controller is further adapted to allow special access to said locker unit by said registered parties when a wrong delivery or a wrong item is placed into said locker unit.

6. A method of making a delivery or pickup of a good to a customer using a system for facilitating a delivery and pickup of goods comprising:
a plurality of locker modules, each of said locker modules having a plurality of locker units, a locker controller, a user interfacing device, a user-identifying device, and a remote receiving and transmitting device;
a system controller independent from the plurality of locker modules, the system controller having an application server, a database server, and a remote receiving and transmitting device for communicating with said remote receiving and transmitting device of said locker modules; wherein said system controller is adapted to facilitate leasing of said locker units by registered parties for delivery or pickup of a good, said registered parties including a customer, a vendor and a delivery agent;
a customer's PC terminal communicably connected to said system controller;
a vendor's PC terminal communicably connected to said system controller; and
a delivery agent's PC terminal communicably connected to said system controller, said method comprising:
receiving, by said system controller, a request for use of a locker unit for said delivery or said pickup of said good;
reserving, by said system controller, said locker unit in response to said receiving step; and
notifying, by said system controller, said customer after said delivery of said good or of said locker unit for drop off of said good for said pick-up.

7. The method of claim 6, and further comprising the step of notifying said vendor or said delivery agent of a drop off of said good.

8. The method of claim 6, and further comprising the step of registering, by said system controller, particulars of said customer, said vendor, said delivery agent, and delivery persons prior to said receiving step.

9. The method of claim 8, and further comprising the step of providing, by said system controller, login identification to each of said registered parties based upon particulars received from said registered parties, said login identification being associated with a smart card and a pin number of each of said registered parties.

10. The method of claim 9, and further comprising the step of providing, by said locker controller, said pin number and information on said smart card to said locker controller for said leasing.

11. The method of claim 6, and further comprising the step of allowing, by said system controller, special access to said locker unit by said registered parties when a wrong delivery or a wrong item is placed into said locker unit.

12. The method of claim 6, and further comprising the step of renewing a lease period for said locker unit after said lease period runs out.

13. The method of claim 6, wherein said method further comprises the step of providing a transaction number, by said system controller, to said vendor or said delivery agent after said reserving step.

14. The method of claim 13, and further comprising the step of receiving, by said system controller, said transaction number and a login identification number associated with a delivery person to enable said delivery of said good or pickup of said drop off of said good.

* * * * *